US012770317B2

(12) United States Patent
Yoon et al.

(10) Patent No.: US 12,770,317 B2
(45) Date of Patent: Oct. 20, 2026

(54) GENERATING A LATENT SPACE FOR A THREE-DIMENSIONAL SCENE

(71) Applicant: Adobe Inc., San Jose, CA (US)

(72) Inventors: Jae shin Yoon, San Jose, CA (US); Yangtuanfeng Wang, London (GB); Quankai Gao, Los Angeles, CA (US); Krishna Kumar Singh, San Jose, CA (US); Iliyan Atanasov Georgiev, London (GB)

(73) Assignee: Adobe Inc., San Jose, CA (US)

( * ) Notice: Subject to any disclaimer, the term of this patent is extended or adjusted under 35 U.S.C. 154(b) by 81 days.

(21) Appl. No.: 19/063,083

(22) Filed: Feb. 25, 2025

(65) Prior Publication Data

US 2026/0253311 A1 Aug. 27, 2026

(51) Int. Cl.
*G06T 15/08* (2011.01)
*G06T 15/10* (2011.01)
*G06T 15/50* (2011.01)

(52) U.S. Cl.
CPC .............. *G06T 15/08* (2013.01); *G06T 15/10* (2013.01); *G06T 15/50* (2013.01); *G06T 2210/61* (2013.01)

(58) Field of Classification Search
None
See application file for complete search history.

(56) References Cited

U.S. PATENT DOCUMENTS

2024/0242435 A1* 7/2024 Wang .................... H04N 21/816
2026/0141137 A1* 5/2026 Heydari .................. G06F 30/27

OTHER PUBLICATIONS

Almeida, Luisb. , "Multilayer perceptrons", In Handbook of Neural Computation, pp. C1-C2. CRC Press, 1997, 30 pages.
Belov, et al., "Distributions of the Kullback-Leibler divergence with applications", British Journal of Mathematical and Statistical Psychology, vol. 64, No. 2, Apr. 15, 2011, 19 pages.
Brock, et al., "Generative and Discriminative Voxel Modeling with Convolutional Neural Networks", arXiv Preprint, Cornell University, Aug. 16, 2016, 9 pages.
Chen, et al., "MeshAnything: Artist-Created Mesh Generation with Autoregressive Transformers", arXiv Preprint, Cornell University, Oct. 9, 2024, 19 pages.
Choy, et al., "4D Spatio-Temporal ConvNets: Minkowski Convolutional Neural Networks", arXiv Preprint, Cornell University, Jun. 13, 2019, 21 pages.
Dosovitskiy, et al., "An image is worth 16x16 words: Transformers for image recognition at scale.", arXiv Preprint, Cornell University, Jun. 3, 2021, 22 pages.
Gao, et al., "GET3D: A Generative Model of High Quality 3D Textured Shapes Learned from Images", arXiv Preprint, Cornell University, Sep. 22, 2022, 39 pages.

(Continued)

*Primary Examiner* — Frank S Chen
(74) *Attorney, Agent, or Firm* — FIG. 1 Patents

(57) ABSTRACT

In implementation of techniques for generating a latent space for a three-dimensional scene, a computing device implements a latent space system to receive a three-dimensional representation of a scene. Using a machine learning model, the latent space system encodes a tokenized three-dimensional representation based on the three-dimensional representation of the scene into a latent space. The latent space system then decodes three-dimensional information related to the scene from the latent space using the machine learning model.

20 Claims, 10 Drawing Sheets

(56) References Cited

OTHER PUBLICATIONS

Han, et al., "VFusion3D: Learning Scalable 3D Generative Models from Video Diffusion Models", arXiv Preprint, Cornell University, Jul. 18, 2024, 24 pages.
Hong, et al., "LRM: Large Reconstruction Model for Single Image to 3D", arXiv Preprint, Cornell University, Mar. 9, 2024, 25 pages.
Hu, et al., "MVD-Fusion: Single-view 3D via Depth-consistent Multi-view Generation", arXiv Preprint, Cornell University, Apr. 4, 2024, 11 pages.
Jaegle, et al., "Perceiver IO: A General Architecture for Structured Inputs & Outputs", arXiv Preprint, Cornell University, Mar. 15, 2022, 29 pages.
Jaegle, et al., "Perceiver: General Perception with Iterative Attention", arXiv Preprint, Cornell University, Jun. 23, 2021, 43 pages.
Jiang, et al., "Leap: Liberate Sparse-View 3D Modeling From Camera Poses", arXiv Preprint, Cornell University, Oct. 2, 2023, 19 pages.
Jun, et al., "Shap-E: Generating Conditional 3D Implicit Functions", Cornell University, arXiv.org, [retrieved from the internet on May 8, 2025], <https://arxiv.org/pdf/2305.02463>, May 3, 2023, 23 pages.
Kirillov, et al., "Segment Anything", Cornell University, arXiv.org, arXiv:2304.02643 [cs.CV], retrieved from the internet on May 20, 2024, <https://arxiv.org/abs/2304.02643>, Apr. 5, 2023, 30 pages.
Li, et al., "BLIP: Bootstrapping Language-Image Pre-training for Unified Vision-Language Understanding and Generation", Cornell University, arXiv.org, arXiv:2201.12086 [cs.CV], retrieved from the internet on May 25, 2024, <https://arxiv.org/abs/2201.12086>, Feb. 15, 2022, 12 pages.
Li, et al., "InfiniteNature-Zero: Learning Perpetual View Generation of Natural Scenes from Single Images", Cornell University, arXiv.org, [retrieved from the internet on May 9, 2025], <https://arxiv.org/pdf/2207.11148>, Jul. 22, 2022, 20 pages.
Li, et al., "Instant3D: Fast TEXT-TO-3D With Sparse-View Generation and Large Reconstruction Model", Cornell University arXiv Preprint, arXiv.org [retrieved Jul. 21, 2024]. Retrieved from the Internet <https://arxiv.org/pdf/2311.06214>., Nov. 23, 2023, 25 pages.
Liu, et al., "Infinite Nature: Perpetual View Generation of Natural Scenes from a Single Image", Cornell University, arXiv.org, [retrieved from the internet on May 9, 2025], <https://arxiv.org/pdf/2012.09855>, Nov. 30, 2021, 17 pages.
Liu, et al., "Zero-1-to-3: Zero-shot One Image to 3D Object", Cornell University, arXiv.org, [retrieved from the internet on Apr. 8, 2025], <https://arxiv.org/pdf/2303.11328>, Mar. 20, 2023, 13 pages.
Ma, et al., "Latte: Latent Diffusion Transformer for Video Generation", Cornell University, arXiv.org, [retrieved from the internet on May 9, 2025], <https://arxiv.org/pdf/2401.03048>, May 1, 2025, 20 pages.
Malo, Jesús, "Normalized image representation for efficient coding", In The Thirty-Seventh Asilomar Conference on Signals, Systems & Computers, 2003, pp. 1408-1412, 2003,.
Michel, et al., "Text2Mesh: Text-Driven Neural Stylization for Meshes", Cornell University, arXiv.org, [retrieved from the internet on Apr. 2, 2025], <https://arxiv.org/pdf/2112.03221>, Dec. 6, 2021, 15 pages.
Mildenhall, et al., "NeRF: Representing Scenes as Neural Radiance Fields for View Synthesis", Cornell University arXiv, arXiv.org [retrieved Mar. 19, 2023]. Retrieved from the Internet <https://arxiv.org/pdf/2003.08934.pdf>., Aug. 3, 2020, 25 pages.
Nichol, et al., "Point-E: A System for Generating 3D Point Clouds from Complex Prompts", Cornell University, arXiv.org, [retrieved from the internet on May 9, 2025], <https://arxiv.org/pdf/2212.08751>, Dec. 16, 2022, 14 pages.
Pekhimenko, et al., "TerseCades: Efficient Data Compression in Stream Processing", Proceedings of the 2018 USENIX Annual Technical Conference (USENIX ATC '18), [retrieved from the internet on May 9, 2025], <https://www.usenix.org/system/files/conference/atc18/atc18-pekhimenko.pdf>, Jul. 2018, 15 pages.
Poole, et al., "Dreamfusion: TEXT-TO-3D Using 2D Diffusion", Cornell University, arXiv.org, [retrieved from the internet on Oct. 25, 2024], <https://arxiv.org/pdf/2209.14988>, Sep. 29, 2022, 18 pages.
Qi, et al., "PointNet: Deep Learning on Point Sets for 3D Classification and Segmentation", Cornell University arXiv, arXiv.org [retrieved Mar. 15, 2023]. Retrieved from the Internet <https://arxiv.org/pdf/1612.00593.pdf>., Apr. 10, 2017, 19 pages.
Qi, Charlesr. , "PointNet++: Deep Hierarchical Feature Learning on Point Sets in a Metric Space", Cornell University arXiv, arXiv.org [retrieved Mar. 16, 2023]. Retrieved from the Internet <https://arxiv.org/pdf/1706.02413.pdf>., Jun. 2017, 10 pages.
Rombach, et al., "High-Resolution Image Synthesis with Latent Diffusion Models", Cornell University arXiv, arXiv.org [retrieved Aug. 11, 2023]. Retrieved from the Internet <https://arxiv.org/pdf/2112.10752.pdf>., Apr. 13, 2022, 45 pages.
Schonberger, et al., "Structure-from-Motion Revisited", In 2016 IEEE Conference on Computer Vision and Pattern Recognition, Dec. 2016, 10 pages.
Shi, et al., "MVDream: Multi-View Diffusion for 3D Generation", Cornell University, arXiv.org, [retrieved from the internet on Nov. 21, 2024], <https://arxiv.org/pdf/2308.16512>, Apr. 18, 2024, 21 pages.
Siddiqui, et al., "MeshGPT: Generating Triangle Meshes with Decoder-Only Transformers", Cornell University, arXiv.org, [retrieved from the internet on May 9, 2025], <https://arxiv.org/pdf/2311.15475>, Nov. 27, 2023, 16 pages.
Tancik, et al., "Fourier Features Let Networks Learn High Frequency Functions in Low Dimensional Domains", Cornell University arXiv, arXiv.org [retrieved Aug. 9, 2023]. Retrieved from the Internet <https://arxiv.org/pdf/2006.10739.pdf>., Jun. 18, 2020, 24 pages.
Tang, et al., "DreamGaussian: Generative Gaussian Splatting for Efficient 3D Content Creation", Cornell University, arXiv.org, [retrieved from the internet on May 9, 2025], <https://arxiv.org/pdf/2309.16653>, Mar. 29, 2024, 18 pages.
Tang, et al., "LGM: Large Multi-View Gaussian Model for High-Resolution 3D Content Creation", Cornell University arXiv Preprint, arXiv.org [retrieved Jul. 21, 2024]. Retrieved from the Internet <https://arxiv.org/pdf/2402.05054>., Feb. 7, 2024, 20 pages.
Tran, et al., "Learning Spatiotemporal Features with 3D Convolutional Networks", Cornell University arXiv, arXiv.org [retrieved Mar. 16, 2023]. Retrieved from the Internet <https://arxiv.org/pdf/1412.0767.pdf>., Oct. 7, 2015, 16 pages.
Van Der Maaten, et al., "Visualizing Data using t-SNE", Journal of Machine Learning Research, Nov. 2008, 25 pages.
Vaswani, et al., "Attention Is All You Need", Cornell University arXiv Preprint, arXiv.org [retrieved Aug. 9, 2023]. Retrieved from the Internet <https://arxiv.org/pdf/1706.03762.pdf>., Dec. 6, 2017, 15 pages.
Wang, et al., "Attentive Normalization for Conditional Image Generation", Cornell University, arXiv.org, [retrieved from the internet on May 9, 2025], <https://arxiv.org/pdf/2004.03828>, Apr. 8, 2020, 10 pages.
Xu, et al., "DMV3D: Denoising Multi-View Diffusion Using 3D Large Reconstruction Model", Cornell University arXiv Preprint, arXiv.org [retrieved Jul. 21, 2024]. Retrieved from the Internet <https://arxiv.org/pdf/2311.09217>., Nov. 15, 2023, 18 pages.
Yi, et al., "GaussianDreamer: Fast Generation from Text to 3D Gaussians by Bridging 2D and 3D Diffusion Models", Cornell University, arXiv.org, [retrieved from the internet on Apr. 2, 2025], <https://arxiv.org/pdf/2310.08529>, May 13, 2024, 15 pages.
Zhang, et al., "NeRF++: Analyzing and Improving Neural Radiance Fields", Cornell University arXiv, arXiv.org [retrieved Jul. 1, 2024]. Retrieved from the Internet <https://arxiv.org/abs/2010.07492>., Oct. 21, 2020, 9 pages.
Zhao, et al., "Michelangelo: Conditional 3D Shape Generation based on Shape-Image-Text Aligned Latent Representation", Cornell University, arXiv.org, [retrieved from the internet on May 9, 2025], <https://arxiv.org/pdf/2306.17115>, Jul. 3, 2023, 20 pages.

* cited by examiner

GENERATING A LATENT SPACE FOR A THREE-DIMENSIONAL SCENE

BACKGROUND

A three-dimensional representation is a virtual three-dimensional composition formed from an input including images or text. The three-dimensional representation, for instance, is a translation of an object or a scene depicted in a two-dimensional space into a three-dimensional space. In other examples, the three-dimensional representation is generated based on input text describing the object or the scene. Three-dimensional representations are used in a variety of applications, including virtual reality, product design, architectural rendering, and animation. However, techniques involving generating three-dimensional representations involve computational inefficiencies and visual inaccuracies in real world scenarios.

SUMMARY

Techniques and systems for generating a latent space for a three-dimensional scene are described. In an example, a latent space system receives a three-dimensional representation of a scene. For example, the three-dimensional representation of the scene is a three-dimensional Gaussian splatting representation constructed based on digital images depicting different views of the scene. In some examples, the three-dimensional representation of the scene indicates parameters including at least one of rotation, translation, scale, center position, scale, or opacity.

The latent space system encodes a tokenized three-dimensional representation based on the three-dimensional representation of the scene into a latent space using a machine learning model. In this example, for instance, the machine learning model is a transformer-based variational autoencoder that is trained based on the three-dimensional information related to the scene to generate the three-dimensional representation. In some examples, encoding the tokenized three-dimensional representation involves tokenizing the three-dimensional representation into canonical three-dimensional tokens using a transformer-based variational autoencoder.

The latent space system decodes three-dimensional information related to the scene from the latent space using the machine learning model. For instance, the three-dimensional information related to the scene describes at least one of geometry or lighting related to the scene.

In some additional examples, based on the three-dimensional information related to the scene, the latent space system generates an additional three-dimensional representation. For instance, the three-dimensional representation is based on a received input describing a different scene having a visual feature of the scene.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
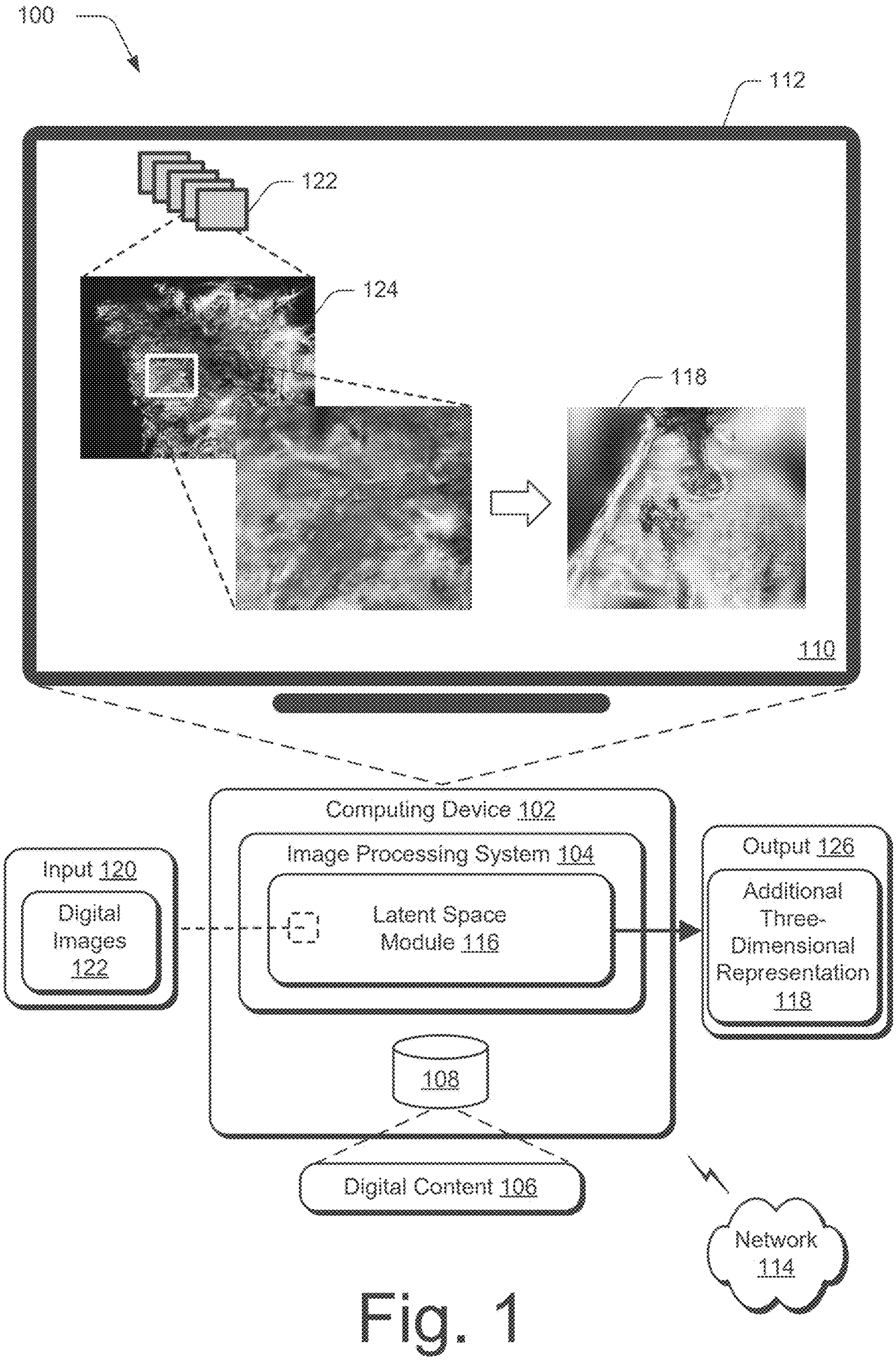
FIG. 1 is an illustration of a digital medium environment in an example implementation that is operable to employ techniques and systems for generating a latent space for a three-dimensional scene as described herein.

A three-dimensional Gaussian splatting representation is a collection of anisotropic Gaussians that form a three-dimensional model of a scene. The anisotropic Gaussians, for instance, are ellipsoid-shaped clusters that are capable of forming complex geometries mimicking three-dimensional aspects of scenes. Although three-dimensional Gaussians splatting representations are used to generate reproductions of scenes in a three-dimensional space, its applications are limited to reproducing an existing scene. In contrast, some desired applications involve generating scene representations using generative machine learning models based on text inputs describing a scene that is different from the scene depicted by the three-dimensional Gaussians splatting representation.

Conventional scene representation techniques use models that are trained directly on three-dimensional Gaussian splatting representations to generate scene representations. However, these scene representations include floaters and other undesirable visual defects because the three-dimensional Gaussian splatting representations are scene-dependent and do not include explicit three-dimensional information related to the scene.

Techniques and systems are described for generating a latent space for a three-dimensional scene that overcome these limitations. For instance, the latent space includes encoded three-dimensional information related to a three-dimensional representation of the scene, which is used to train a machine learning model to construct an additional three-dimensional representation based on a subsequent image or text input. For example, the additional three-dimensional representation displays three-dimensional features with realistic geometry and lighting, resulting from the model being trained by decoding the three-dimensional information related to a scene from the latent space. The floaters and other defects typical of scene representations from the conventional scene representation techniques are also absent from the additional three-dimensional representation.

A latent space system begins in this example by receiving an input including digital images depicting a scene or a three-dimensional Gaussian splatting representation of the scene. In an image-input example, the digital images depicting the scene are captured from multiple angles that depict different points for view of the scene, for instance, focused on different objects or points of interest of the scene. In this example, the latent system generates a three-dimensional Gaussian splatting representation of the scene based on the digital images. As part of this, the latent space system constructs point clouds, including three-dimensional points that are individually converted into a Gaussian primitive, which forms the three-dimensional Gaussian splatting representation.

As discussed above, in some examples the latent space system directly receives the three-dimensional Gaussian splatting representation. Instead of generating the three-dimensional Gaussian splatting representation, for instance, the latent space system receives a training dataset including the three-dimensional Gaussian splatting representation.

The latent space system involves a machine learning model, for example a transformer-based variational autoencoder or other generative model, that is trained to generate an additional three-dimensional representation based on a received input. The training objective, for instance, is to generate the additional three-dimensional representation that corresponds to a text prompt describing features of an additional scene.

To train the machine learning model, the latent space system tokenizes the three-dimensional Gaussian splatting representation to form a tokenized three-dimensional Gaussian splatting representation. For instance, the three-dimensional Gaussian splatting representation is converted into a fixed-dimensional feature vector. The encoder system then encodes the tokenized three-dimensional Gaussian splatting representation into a latent space.

The latent space system then obtains three-dimensional information related to the scene by decoding the latent space. The three-dimensional information related to the scene describes geometry, lighting, or other physical features related to three-dimensional attributes of the scene, which is usable to generate three-dimensional representations of other scenes. For instance, the machine learning model uses the three-dimensional information to reconstruct the three-dimensional Gaussian splatting representation and learn to generate an additional three-dimensional representation based on a text or image input.

Following the training of the machine learning model, the latent space system then leverages the machine learning model to generate an output including the additional three-dimensional representation based on an input prompt. Because the machine learning model is trained on encoding the tokenized three-dimensional Gaussian splatting representation into the latent space and then decoding the three-dimensional information from the latent space, the machine learning model is effectively trained to generate the additional three-dimensional representation based on the image or text input that is a realistic and accurate depiction of described features of an additional scene.

Generating a latent space for a three-dimensional scene in this manner overcomes the limitations of conventional scene representation techniques that train a machine learning model directly on three-dimensional Gaussian splatting representations. For example, generating a latent space including encoded three-dimensional information related to the scene for training the machine learning model results in outputs that are more realistic than those produced by the conventional scene representation techniques. This is because the machine learning model is trained by encoding and decoding the latent space, which configures the model to later generate additional three-dimensional representations having three-dimensional features with realistic geometry and lighting. Visual defects, including floaters which are typical of outputs from the models used by the conventional three-dimensional representation techniques are also absent from the outputs produced by generating a latent space for a three-dimensional scene.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for generating a latent space for a three-dimensional scene described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 10.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes a latent space module 116 which is illustrated as incorporated by the image processing system 104 to process the digital content 106. In some examples, the latent space module 116 is separate from the image processing system 104 such as in an example in which the latent space module 116 is available via the network 114.

The latent space module 116 is configured to train a machine learning model to generate an additional three-dimensional representation 118. In some examples, the latent space module 116 begins by receiving digital images 122 depicting a scene. The digital images 122, for instance, are captured from multiple different angles and depict the scene from different viewpoints. The scene is part of a real-world environment or a virtual environment and includes a variety of objects, including structures, landscaping, or other visual features. In some examples the digital images 122 depict a partial or full view of the scene. Camera parameters used for capturing the digital images 122 are also received with the digital images 122 in some examples.

After receiving the digital images 122 depicting the scene, the latent space module 116 generates a three-dimensional Gaussian splatting representation 124 of the scene based on the digital images 122. To do this, the latent space module 116 reconstructs an initial sparse three-dimensional point cloud, to provide a more detailed representation of the scene. The three-dimensional points are then individually converted into a Gaussian primitive, characterized by its spatial position, covariance (defining shape and orientation), color, opacity, and scale.

In other examples, the latent space module 116 begins by receiving the three-dimensional Gaussian splatting representation 124 of the scene or other representation of the scene. For instance, the three-dimensional Gaussian splatting representation 124 of the scene is received as part of a dataset, without receiving the digital images 122.

The latent space module 116 involves an encoder and a decoder. As part of the encoder, the latent space module 116 tokenizes the three-dimensional Gaussian splatting representation 124 to form a tokenized three-dimensional Gaussian splatting representation, which is then encoded into a latent space using a machine learning model. In this example, the machine learning model is a transformer-based autoencoder.

To derive insight related to geometrical features of the scene, the latent space module 116 then decodes the latent space using the machine learning model to obtain three-dimensional information related to the scene. The three-dimensional information related to the scene describes geometry, lighting, or other physical features related to three-dimensional attributes of the scene. The machine learning model uses the three-dimensional information to reconstruct the three-dimensional Gaussian splatting representation 124 and learn to generate an additional three-dimensional representation 118 based on a text or image input.

In an example, following the training, the latent space module 116 receives an input including a text prompt describing the additional three-dimensional representation 118, which includes a physical feature of the scene or describes a different scene. Because the latent space module 116 is trained on reconstructing the three-dimensional Gaussian splatting representation 124 based on the three-dimensional information related to the scene, the latent space module 116 generates an output 126 including the additional three-dimensional representation 118, further examples of which are described in the following sections and shown in corresponding figures. The additional three-dimensional representation 118 accurately depicts the physical features of the scene described by the text prompt because the machine learning model is trained on reconstructing the three-dimensional Gaussian splatting representation 124, which involves three-dimensional information related to the scene that is leveraged by the machine learning model during generation of other representations.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Generating a Latent Space for a Three-Dimensional Scene

Figure 2:
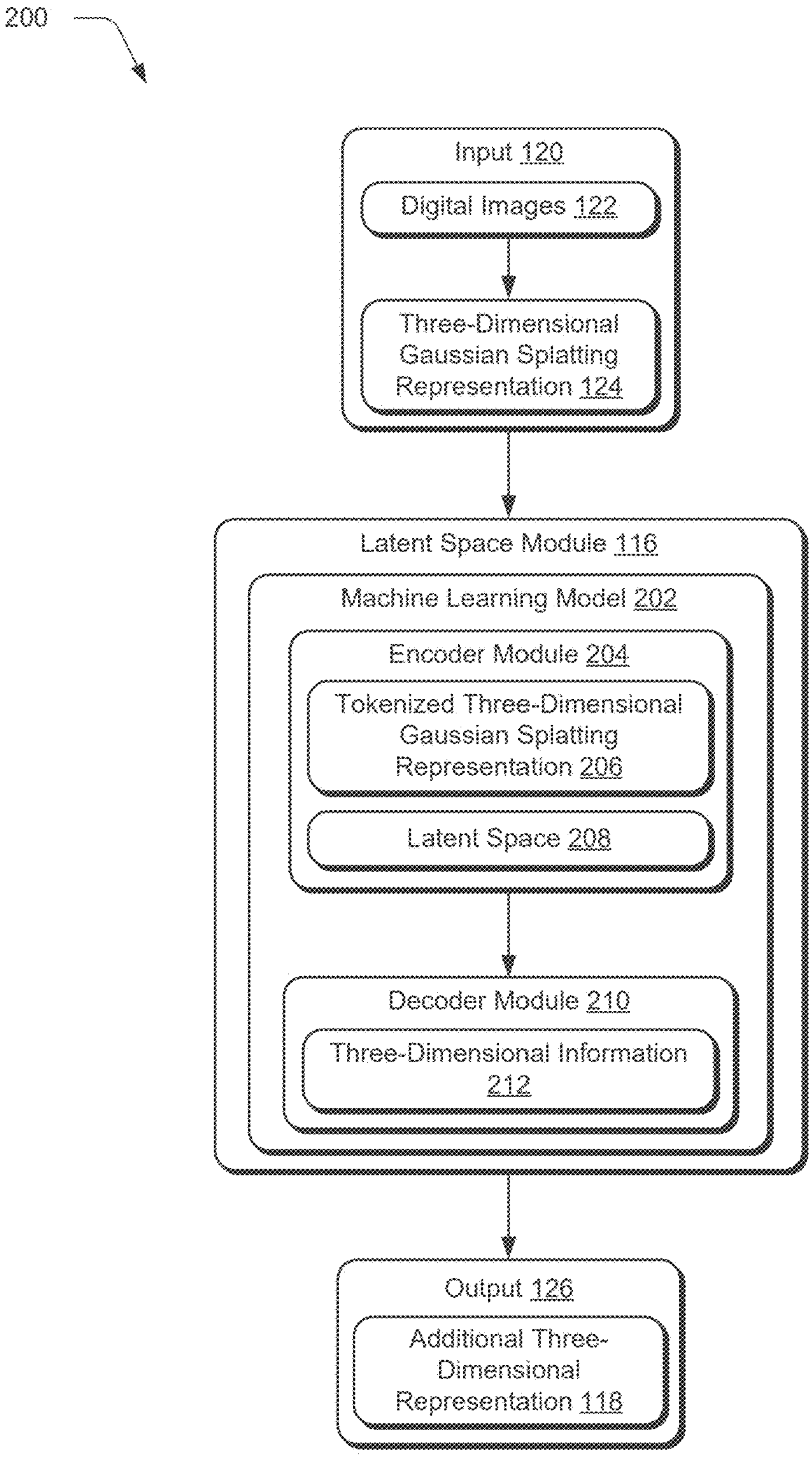
FIG. 2 depicts a system in an example implementation showing operation of a latent space module for generating a latent space for a three-dimensional scene.

FIG. 2 depicts a system 200 in an example implementation showing operation of the latent space module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-10.

To begin in this example, a latent space module 116 receives an input 120 including digital images 122 depicting a scene or a three-dimensional Gaussian splatting representation 124 of the scene. In an image-input example, the digital images 122 depicting the scene are captured from multiple angles that depict different points for view of the scene, for instance, focused on different objects or points of interest of the scene. In this example, the latent space module 116 generates a three-dimensional Gaussian splatting representation 124 of the scene based on the digital images 122. As part of this, the latent space module 116 constructs point clouds, including three-dimensional points are then individually converted into a Gaussian primitive, characterized by its spatial position, shape, orientation, color, opacity, and scale.

As discussed above, in some examples the latent space module 116 directly receives the three-dimensional Gaussian splatting representation 124. Instead of generating the three-dimensional Gaussian splatting representation 124, for instance, the latent space module 116 receives a training dataset including the three-dimensional Gaussian splatting representation 124.

The latent space module 116 involves a machine learning model 202 that is trained to generate an additional three-dimensional representation 118. The machine learning model 202 in this example is a transformer-based variational autoencoder. In other examples, the machine learning model 202 is a different type of generative model. The transformer-based variational autoencoder, for instance, uses probability to generate new data samples that resemble a given dataset. The objective of the training of the machine learning model 202 is to generate the additional three-dimensional representation 118 that corresponds to a text prompt describing features of the additional three-dimensional representation 118.

The latent space module 116 includes an encoder module 204. The encoder module 204 tokenizes the three-dimensional Gaussian splatting representation 124 to form a tokenized three-dimensional Gaussian splatting representation 206. For instance, the three-dimensional Gaussian splatting representation 124 converted into a fixed-dimensional feature vector. The encoder module 204 then encodes the tokenized three-dimensional Gaussian splatting representation 206 into a latent space 208, which is explained in further detail with respect to FIG. 3.

The latent space module 116 also includes a decoder module 210. The decoder module 210 obtains three-dimensional information 212 related to the scene by decoding the latent space 208. The three-dimensional information 212 related to the scene describes geometry, lighting, or other physical features related to three-dimensional attributes of the scene. The machine learning model 202 uses the three-dimensional information to reconstruct the three-dimensional Gaussian splatting representation 124 and learn to generate an additional three-dimensional representation 118 based on a text or image input.

For example, following the training of the machine learning model 202, the latent space module 116 then leverages the machine learning model 202 to generate an output 126 including the additional three-dimensional representation 118. Because the machine learning model 202 is trained on encoding the tokenized three-dimensional Gaussian splatting representation 206 into the latent space 208 and then decoding the three-dimensional information 212 from the latent space 208, the machine learning model 202 is trained to generate the additional three-dimensional representation 118 based on the image or text input that is a realistic and accurate depiction of described features or a described scene.

FIGS. 3-6 depict stages of generating a latent space for a three-dimensional scene. In some examples, the stages depicted in these figures are performed in a different order than described below.

Figure 3:
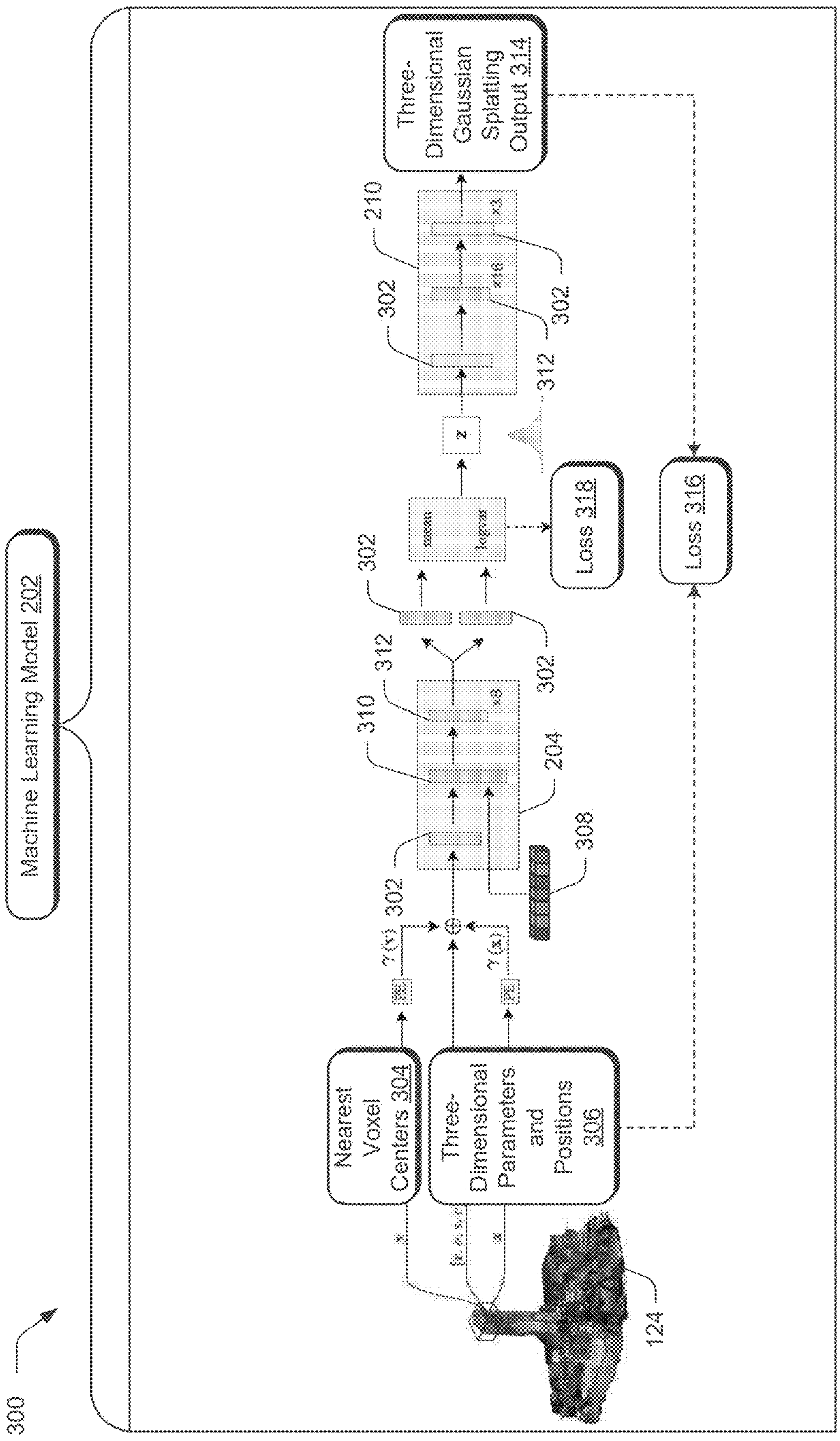
FIG. 3 depicts an example of an architecture of a machine learning model for generating a latent space for a three-dimensional scene.

FIG. 3 depicts an example 300 of an architecture of a machine learning model for generating a latent space for a three-dimensional scene. As illustrated, the latent space module 116 receives a three-dimensional Gaussian splatting representation 124, or in some examples a batch of three-dimensional Gaussian splatting representations of batch size B, where individual scenes contain a number of three-dimensional Gaussian splatting representations N. The encoder module 204 encodes the three-dimensional Gaussian splatting representation 124 into a low-dimensional latent space followed by a variational autoencoder reparameterization. The decoder module 210 reconstructs the embeddings back into a three-dimensional space, corresponding to the three-dimensional Gaussian splatting representation 124.

To begin in this example, given digital images 122 with multiple views and associated camera parameters, a three-dimensional scene depicted in the digital images 122 is represented by a set of elliptical three-dimensional primitives. The elliptical three-dimensional primitives have an internal radiance field that follows a Gaussian distribution. An individual three-dimensional Gaussian primitive has several parameters, including its three-dimensional center $x \in \mathbb{R}^3$, rotation represented by a quaternion $r \in \mathbb{R}^4$, opacity $o \in \mathbb{R}^1$, scaling $s \in \mathbb{R}^3$, view-independent red, green, blue (RGB) color $c \in \mathbb{R}^3$, and view-dependent color with high-dimensional spherical harmonics $c_h \in \mathbb{R}^h$.

The architecture for the machine learning model 202, which is a transformer-based variational autoencoder, includes an encoder module 204 and a decoder module 210. The encoder module 204 maps the tokenized three-dimensional Gaussian splatting representation 206 to a latent space 208, and the decoder module 210 reconstructs the original input three-dimensional Gaussian splatting representation data.

The inputs to the encoder module 204 include a set of three-dimensional Gaussian splatting representation 124 data. The latent space module 116 applies a Fourier positional encoding on three-dimensional Gaussian centers $\gamma(x)$: $\mathbb{R}^{N\times 3}$ $\mathbb{R}^{N\times L_B}$ with a pre-set maximum band $L_B$ to capture high-frequency components in a low-dimensional embedding. The Fourier positional encoding, for instance, encodes positional information by leveraging sinusoidal functions to represent positions. Because the three-dimensional Gaussian splatting representation 124 is unstructured, structured "anchors" are appended as representative locations to corresponding three-dimensional Gaussian splatting representations, to reduce the burden of the encoder module 204 learning. A volume on the space of three-dimensional Gaussian splatting representation 124 is constructed with resolution $V^3$, and the Fourier positional encoding is applied on the voxel center nearest to a given three-dimensional Gaussian splatting representation 124 position $\gamma(v): \mathbb{R}^{N\times 3} \rightarrow \mathbb{R}^{N\times L_B}$.

The encoder module 204 takes per-scene three-dimensional Gaussian splatting representation 124 information $\mathcal{G} \in \mathbb{R}^{N\times(2\times L_B+C)}$ including $\gamma(x)$, $\gamma(v)$, and other three-dimensional Gaussian splatting representation 124 parameters, where N is the number of Gaussians per each scene and C is the size of a three-dimensional Gaussian splatting representation 124 feature dimension. The encoder module 204 begins with a linear layer 302 that maps the inputs, including nearest voxel centers 304 and three-dimensional parameters and positions 306 into key and value, and are tokenized using a cross-attention that takes in the key, value, and a learnable canonical query 308. The learnable canonical query 308 is initialized with regular voxel grids and associated descriptors, including a query $\in \mathbb{R}^{M\times(P+Q)}$ where M is the number of canonical voxels, P denotes a voxel's position, and Q is the size of the descriptors, which is further optimized during the training of the machine learning model 202. In this example, the subsequent eight blocks of self-attention are applied to the tokens to determine relationships among in the latent space 208 while preserving its dimensions as unchanged. The encoder module 204 of the machine learning model 202 in this example also includes a cross-attention block 310 and a self-attention block 312. For both cross- and self-attention operations, query, key, value (QKV)-attention modules are used. For example, the query represents a current token or element looking for relevant information, the key represents tokens attended to, and value holds information for aggregation based on the attention scores.

The outputs from the encoder module 204 are projected into two latent vectors representing mean μ and log-variance log $\sigma^2$. The corresponding embedding z is sampled with the variational autoencoder reparameterization:

$$z = \mu + \epsilon * \exp(0.5 * \log \sigma^2)$$

where $\epsilon \sim \mathcal{N}(0, I)$ is sampled from a normal distribution.

The decoder module 210 takes latent samples z and recovers three-dimensional information 212 $GS_{output}$ 314 through the linear layers and 16 blocks of self-attention in this example, including a linear layer 302, a self-attention block 312, and a linear layer 302 in this example. The decoder module 210, for instance, is absent a predefined output query without cross-attention, for application in a continuous three-dimensional space. For instance, the decoder module 210 has a tail (e.g., final layers of the decoder module 210) that includes multiple linear layers for mapping the latent space 208 into a three-dimensional space.

The training objective for the machine learning model 202 is to minimize the following loss:

$$\mathcal{L} = Dist(GS_{output}, GS_{input}) + \lambda \mathcal{L}_{KL}(z, \mathcal{N}(0, I))$$

where $GS_{input}$ are input three-dimensional Gaussian splatting representations, and the scalar λ balances two losses: a loss 316 corresponding to "Dist," which measures the L2 distance between the recovered three-dimensional Gaussian splatting representations and the ground truth, and a loss 318 corresponding to $\mathcal{L}_{KL}$, which is the Kullback-Leibler (KL) divergence between the latent space z and a normal distribution $\mathcal{N}(0, I)$ so as to have a structured distribution.

In this example, the machine learning model 202 is run on videos in a dataset (for example, a DL3DV-10K dataset with a 6/1 training/testing split), where associated camera positions and structure-from-motion (SfM) points are obtained for initialization. Although this example contemplates the DL3DV-10K dataset, other datasets are used in other examples. Because the DL3DV-10K dataset has no space-time relationship between two given scenes, an upper bound N=100k is applied for Gaussian densification and pruning heuristics. To further suppress noise and improve structure of the latent space 208, semantic-aware filtering, normalization, and augmentation are applied, as described below.

For semantic-aware filtering, three-dimensional information 314 reconstructions from scenes typically contain noise artifacts, including floaters due to a lack of visual observations (unlike objects which are captured with sufficient numbers of digital images). In some examples, if the machine learning model 202 is trained with native three-dimensional Gaussian splatting representation data, unstructured features result from such noise, which dominates the latent space 208, and meaningful high-frequency details are washed out in the three-dimensional information 314. To address this issue in this example, the latent space module 116 applies semantic-guided filtering to the raw three-dimensional Gaussian splatting representation input to sub-sample as clean three-dimensional Gaussian splatting representation primitives. Specifically, a text-guided segmentation model is applied on a middle frame of a given scene video with the text prompt "the most salient region" in this example, and the most semantically meaningful region depicted in the image is cropped out. One Gaussian is selected within the segmentation mask and incrementally includes more Gaussians based on a k-nearest neighbor algorithm in three-dimensional space until reaching a pre-set number, i.e., N=40K. This semantic filtering successfully preserves semantically meaningful content while removing less salient and noisy Gaussians.

For normalization, different three-dimensional Gaussian splatting representation scenes are scale-inconsistent in some examples due to camera calibration, which is heuristic-based rather than metric-based. This introduces significant inconsistencies into the latent space 208 in some examples. To address this, the normalization of an image scale into a coherent scale (e.g., [−1,1]) is applied for accelerating model convergence and generalization. Specifically, to apply normalization to the three-dimensional Gaussian splatting representation data, a mean-shift to the three-dimensional Gaussian splatting representation 124 center to the origin is performed, and the Gaussians are scaled into a coherent sphere in a similar manner to the re-scaling operation used in NeRF++:

$$\text{translate} = -\frac{1}{n}\sum_{i=1}^{n} x_i,$$

$$\text{scale} = \frac{r}{\max|x + \text{translate}|_2 * 1.1},$$

$$\hat{x} = (x + \text{translate}) * \text{scale},$$

$$\hat{s} = x * \text{scale},$$

where r=7. This transformation is also applied to the cameras in some examples.

For augmentation, rotation-equivariant properties are instilled into the latent space 208 by applying random SO(3) rotations, which are rotations that preserve an origin, to input three-dimensional Gaussian splatting representations. For example, the SO(3) rotations are applied in the manner of common random-rotation augmentation applied on two-dimensional images.

Figure 4:
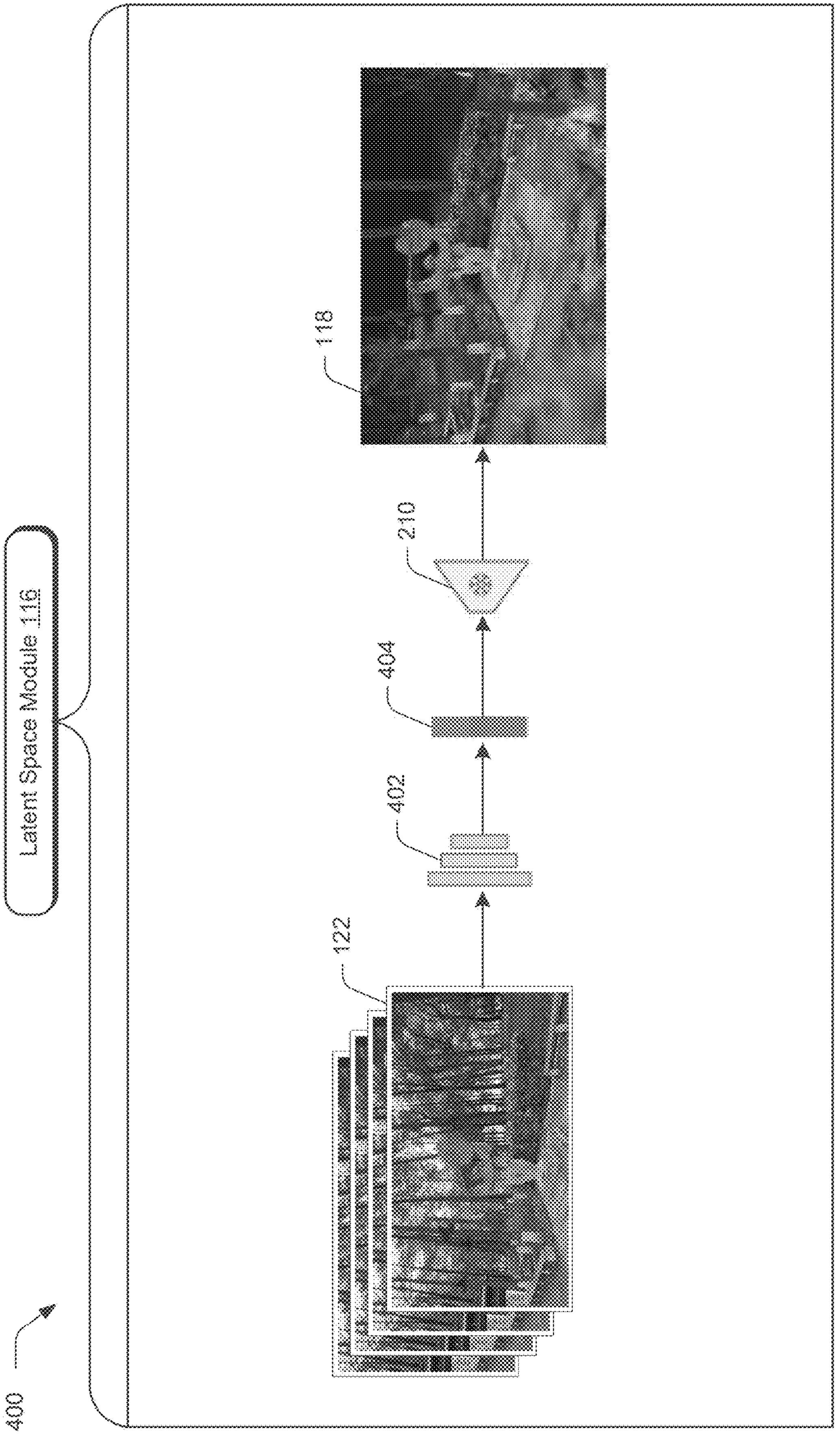
FIG. 4 depicts an example of an image-conditioned latent diffusion model for generating three-dimensional Gaussian splatting representations.

FIG. 4 depicts an example 400 of an image-conditioned latent diffusion model for generating three-dimensional Gaussian splatting representations. The machine learning model 202, for instance, is configurable to generate an additional three-dimensional representation 118 based on a scene depicted in an input including digital images 122. As illustrated, in this example, the latent space module 116 receives digital images 122 at an image encoder 402. Latent samples 404 *z* are passed from the image encoder 402 to the decoder module 210. The decoder module 210 decodes three-dimensional information 212 from the latent samples 404 to generate the additional three-dimensional representation 118.

For example, image encoder 402 that takes as input the digital images 122, which are two-dimensional images and outputs corresponding data encoded into the latent space 208. The decoder module 210 then constructs the associated three-dimensional Gaussian splatting representation 124 scene. The objective of the decoder module 210 training is to minimize an error between the latent samples 404 *z* and Ground-truth three-dimensional Gaussian splatting representation latent samples zGT, which are obtained by inputting three-dimensional Gaussian splatting representation 124 into the encoder module 204.

Figure 5:
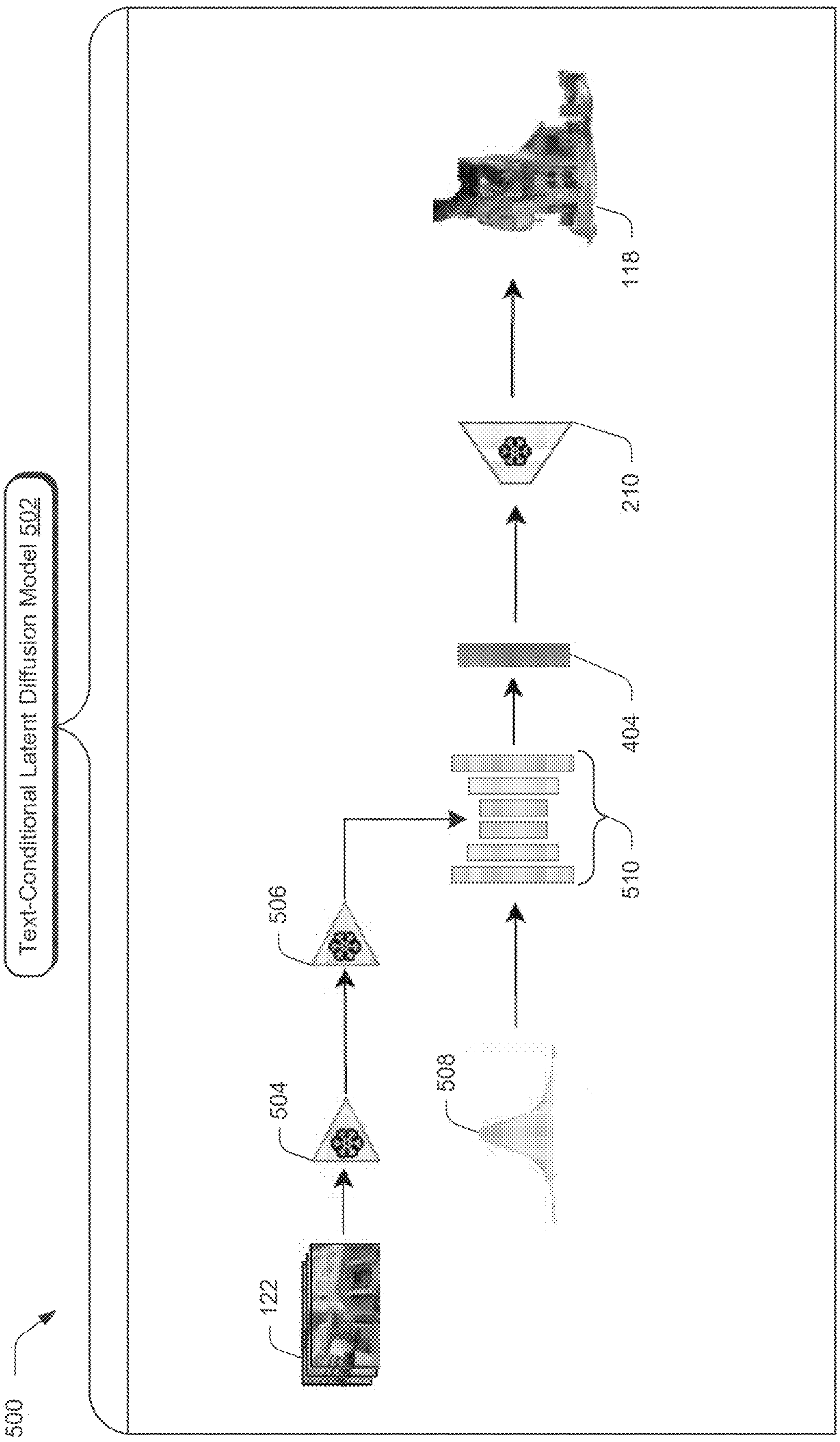
FIG. 5 depicts an example of a text-conditioned latent diffusion model for generating three-dimensional Gaussian splatting representations.

FIG. 5 depicts an example 500 of a text-conditioned latent diffusion model for generating three-dimensional Gaussian splatting representations. The machine learning model 202, for instance, is a text-conditional latent diffusion model 502 that is configurable to generate an additional three-dimensional representation 118 based on a scene described by an input including text.

To begin, the latent space module 116 receives digital images 122 at an image captioning module 504. The latent space module 116 then feeds captioned images from the image captioning module 504 into a text encoder 506. Encoded text from the text encoder 506, along with normal distribution samples 508, are fed into a UNet 510. The UNet 510, for instance, outputs latent samples 404, which are decoded by the decoder module 210. For instance, the decoder module 210 decodes three-dimensional information 212 from the latent samples 404 to generate the additional three-dimensional representation 118.

The UNet 510 is trained for mapping a noise vector sampled from a normal distribution into a meaningful three-dimensional Gaussian splatting representation 124 embedding z, conditioned on text prompts. Because the DL3DV-10K dataset described above with respect to FIG. 3 lacks labels or scene text descriptions for scenes, the latent space module 116 captions the middle frame of the videos to label the scenes using a pre-trained Bootstrapped Language-Image Pretraining (BLIP) model. The pre-trained BLIP model, for instance, is configured for vision-related tasks, including image captioning, and its output includes text prompts that are consistently concise and capture salient semantic information. Although the BLIP model is contemplated in this example, other models are used for captioning in other examples. After this captioning, the diffusion model is trained on (label, z) pairs. At inference, the UNet 510 samples a $z_T \sim \mathcal{N}$ N(0, I) from normal distribution and attempts to denoise it with T steps to approach $z_0 \equiv z$, conditioned on a scene label. The decoder module 210 takes in two denoised latent embeddings from the UNet 510 and outputs the three-dimensional Gaussian splatting representation 124.

Figure 6:
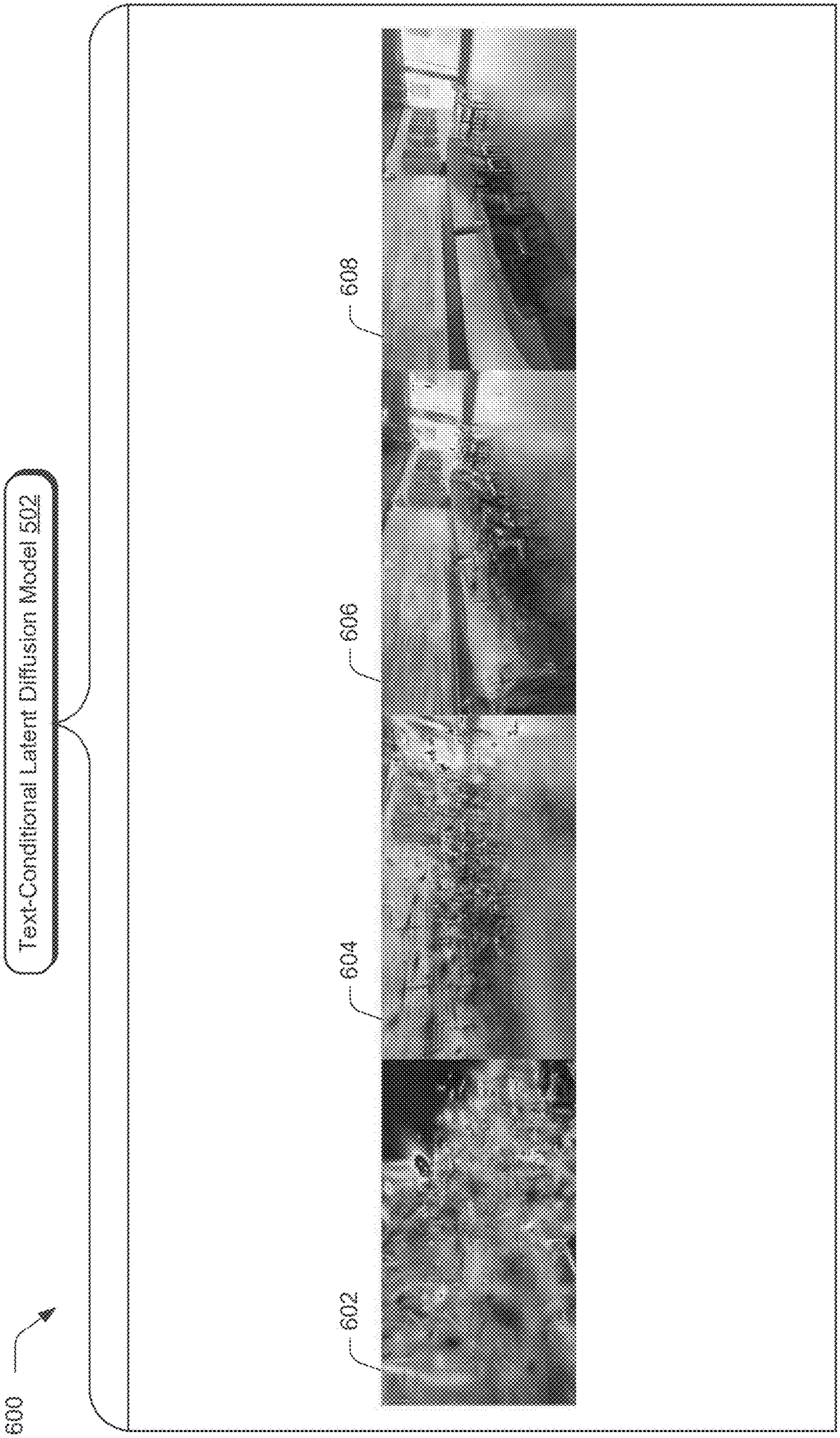
FIG. 6 depicts an example of a three-dimensional Gaussian splatting representation generated by the text-conditioned latent diffusion model.

FIG. 6 depicts an example 600 of a three-dimensional Gaussian splatting representation generated by the text-conditioned latent diffusion model. FIG. 6 is a continuation of the example described in FIG. 5. For instance, the machine learning model 202 generates an additional three-dimensional representation 118 based on a text input.

In this example, the latent space module 116 receives a text input to generate "long table with chairs and a bench in a restaurant." The output images shown depict different denoising times, indicated by T. For instance, output image 602 corresponds to T=1. Output image 604 corresponds to T=10. Output image 606 corresponds to T=25. Finally, output image 608 corresponds to T=50. For instance, detail of the output images correlates to denoising time.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6.

Figure 7:
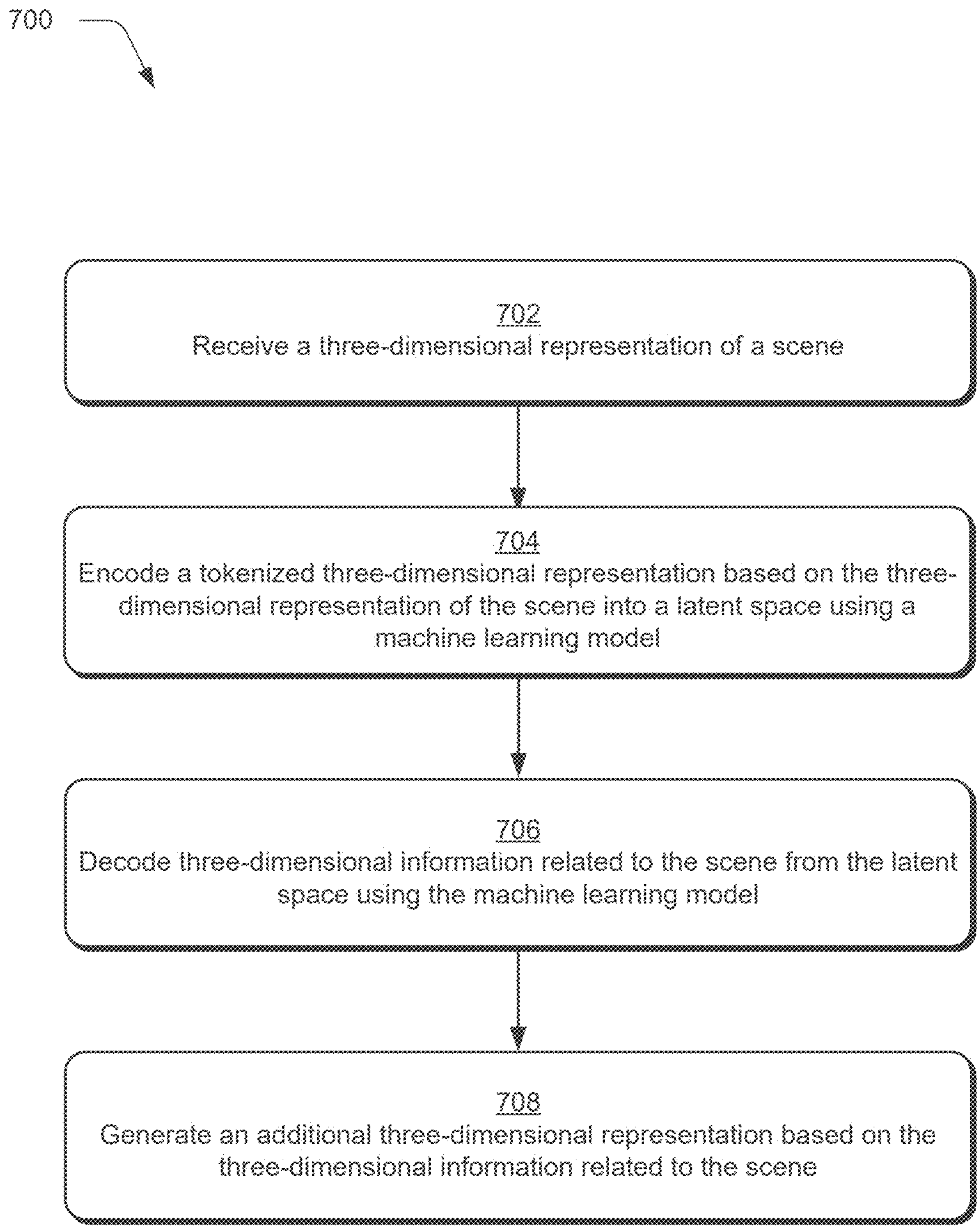
FIG. 7 depicts a procedure in an example implementation of generating a latent space for a three-dimensional scene.

FIG. 7 depicts a procedure 700 in an example implementation of generating a latent space 208 for a three-dimensional scene. At block 702 a three-dimensional representation of a scene is received. For example, the three-dimensional representation of the scene is a three-dimensional Gaussian splatting representation 124 constructed based on digital images 122 depicting different views of the scene. In some examples, the three-dimensional representation of the scene indicates parameters including at least one of rotation, translation, scale, center position, scale, or opacity.

At block 704, a tokenized three-dimensional representation based on the three-dimensional representation of the scene is encoded into a latent space 208 using a machine learning model 202. For example, the machine learning model 202 is a transformer-based variational autoencoder that is trained based on the three-dimensional information 212 related to the scene to generate the additional three-dimensional representation 118. In some examples, encoding the tokenized three-dimensional representation involves tokenizing the three-dimensional representation into canonical three-dimensional tokens using a transformer-based variational autoencoder. Some examples further comprise initializing the three-dimensional representation of the scene with volume grids and associated descriptors for generating the latent space 208.

At block 706, three-dimensional information 212 related to the scene is decoded from the latent space 208 using the machine learning model 202. For instance, the three-dimensional information 212 related to the scene describes at least one of geometry or lighting related to the scene. Some examples further include embedding a parametric three-dimensional structure of the scene into the tokenized three-dimensional representation by initializing learnable queries with regular volume grids and associated descriptors related to three-dimensional geometry and optimizing the parametric three-dimensional structure by training the machine learning model 202 to restore the three-dimensional representation of the scene.

At block 708, an additional three-dimensional representation 118 is generated based on the three-dimensional information 212 related to the scene. For example, the additional three-dimensional representation 118 is based on a received input describing a different scene having a visual feature of the scene.

Figure 8:
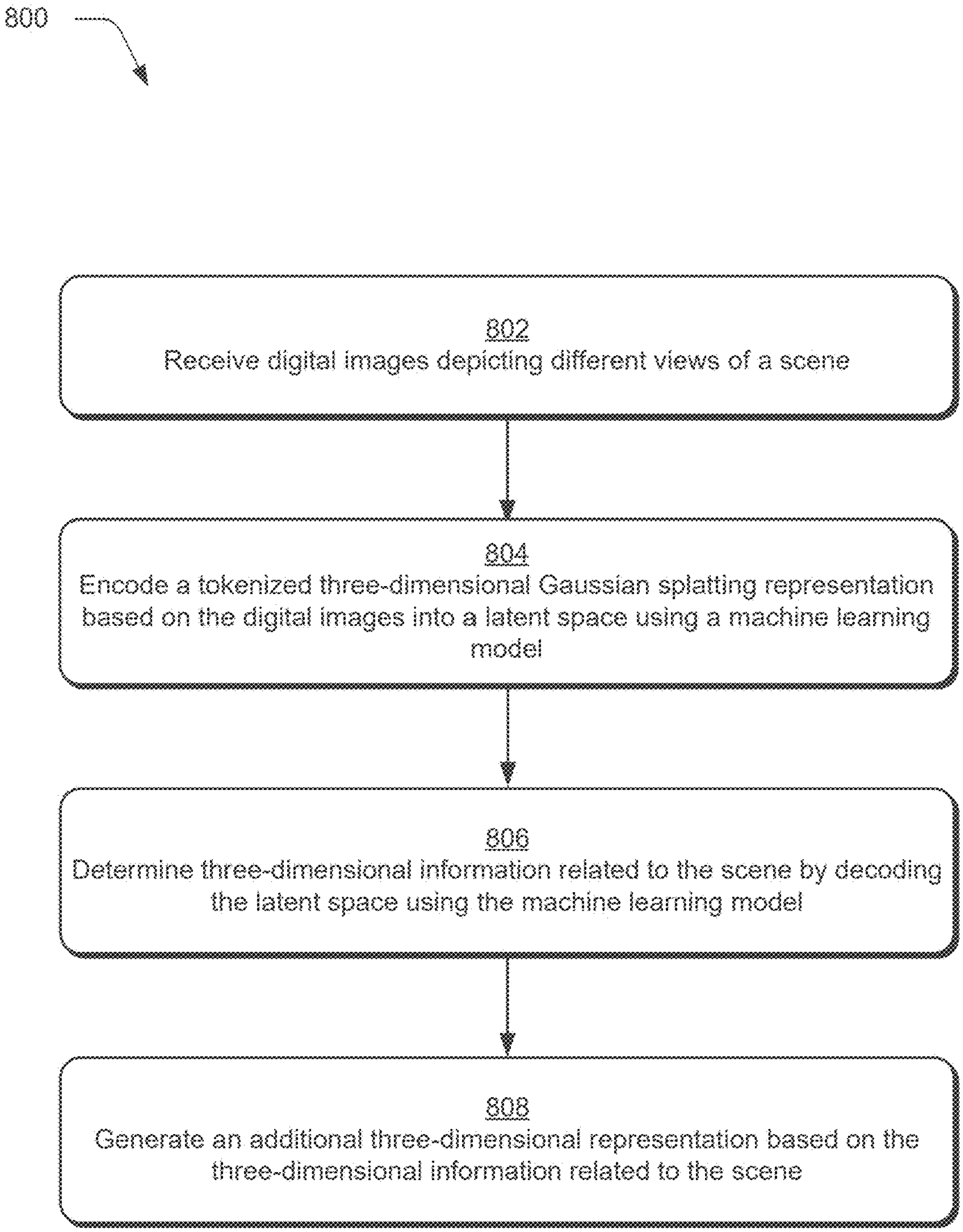
FIG. 8 depicts a procedure in an additional example implementation of generating a latent space for a three-dimensional scene.

FIG. 8 depicts a procedure 800 in an additional example implementation of generating a latent space 208 for a three-dimensional scene. At block 802, digital images 122 depicting different views of a scene are received. The digital images 122, for instance, are captured from different angles.

At block 804, a tokenized three-dimensional Gaussian splatting representation 206 based on the digital images 122 is encoded into a latent space 208 using a machine learning model 202. For example, encoding the tokenized three-dimensional Gaussian splatting representation 206 involves tokenizing a three-dimensional Gaussian splatting representation 124 based on the digital images 122 into canonical three-dimensional tokens using a transformer-based variational autoencoder. In some examples, the machine learning model 202 is a transformer-based variational autoencoder that is trained based on the three-dimensional information 212 related to the scene to generate the additional three-dimensional representation 118. Additionally, some examples involve embedding a parametric three-dimensional structure into the tokenized three-dimensional Gaussian splatting representation 206 by initializing learnable queries with regular volume grids and associated descriptors related to three-dimensional geometry. Additionally or alternatively, some examples involve initializing a three-dimensional Gaussian splatting representation 124 of the scene based on the digital images 122 with volume grids and associated descriptors for generating the latent space 208.

At block 806, three-dimensional information 212 related to the scene is determined by decoding the latent space 208 using the machine learning model 202. Additionally, some examples involve optimizing the parametric three-dimensional structure of the scene by training the machine learning model 202 to restore a three-dimensional Gaussian splatting representation 124 of the scene. For instance, the three-dimensional information 212 related to the scene describes at least one of geometry or lighting related to the scene.

At block 808, an additional three-dimensional representation 118 is generated based on the three-dimensional information 212 related to the scene. In some examples, the additional three-dimensional representation 118 is output in response to a received input describing a different scene having a visual feature of the scene.

Figure 9:
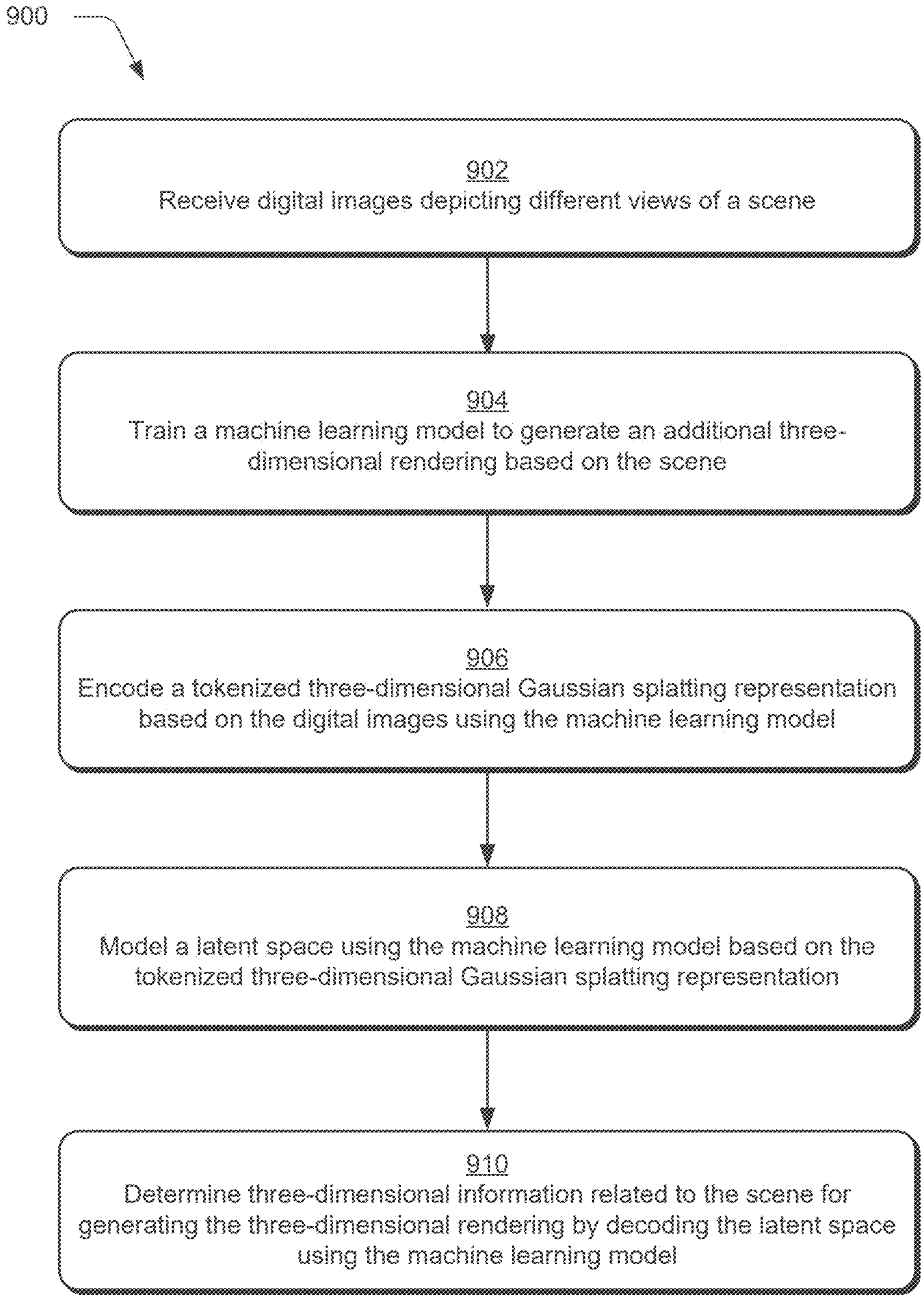
FIG. 9 depicts a procedure in an additional example implementation of generating a latent space for a three-dimensional scene.

FIG. 9 depicts a procedure 900 in an additional example implementation of generating a latent space 208 for a three-dimensional scene. At block 902, digital images 122 depicting different views of a scene are received. The different views of the scene, for instance, are depicted from different angles or from different points of view of an image capture device.

At block 904, a machine learning model 202 is trained to generate an additional three-dimensional representation 118 based on the scene. For example, the machine learning model 202 is a transformer-based variational autoencoder that is trained based on the three-dimensional information 212 related to the scene to generate the additional three-dimensional representation 118.

At block 906, a tokenized three-dimensional Gaussian splatting representation 206 based on the digital images 122 is encoded using the machine learning model 202. For example, encoding the tokenized three-dimensional Gaussian splatting representation 206 involves tokenizing a three-dimensional Gaussian splatting representation 124 of the digital images 122 into canonical three-dimensional tokens using a transformer-based variational autoencoder. Additionally, some examples include embedding a parametric three-dimensional structure into the tokenized three-dimensional Gaussian splatting representation 206 by initializing learnable queries with regular volume grids and associated descriptors.

At block 908, a latent space 208 is modeled using the machine learning model 202 based on the tokenized three-dimensional Gaussian splatting representation 206. The latent space 208, for instance, includes encoded information related to geometrical features of the scene.

At block 910, three-dimensional information 212 related to the scene for generating the additional three-dimensional representation 118 is determined by decoding the latent space 208 using the machine learning model 202. For example, the three-dimensional information 212 related to the scene describes at least one of geometry or lighting related to the scene.

Example System and Device

Figure 10:
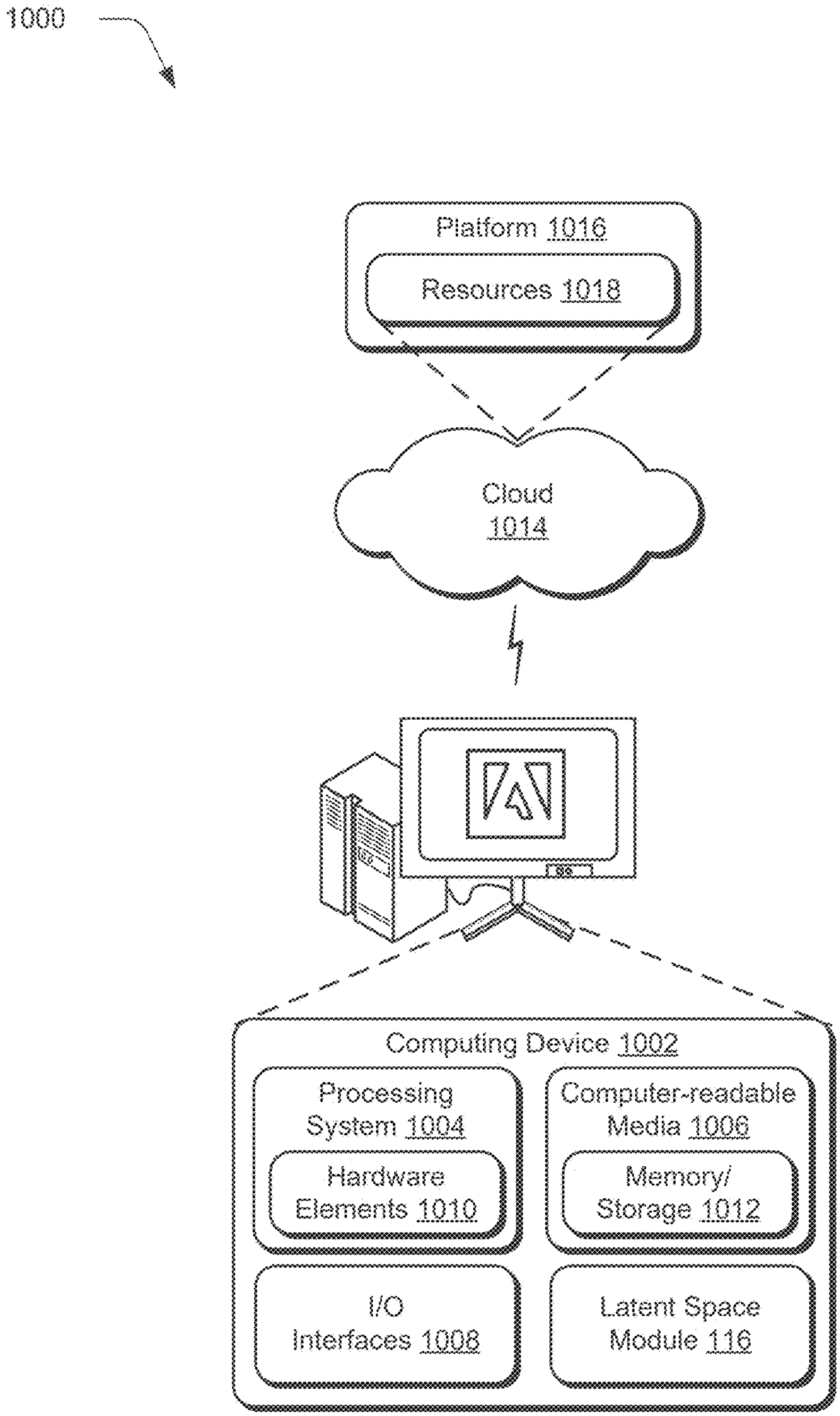
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the latent space module 116. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices and/or processing systems 1004) to implement techniques, modules, and examples described herein.

The techniques described herein are supported by various configurations of the computing device 1002 and are not limited to the specific examples of the techniques described herein. This functionality is also implementable through use of a distributed system, such as over a "cloud" 1114 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized when computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

What is claimed is:

1. A method comprising:

receiving, by a processing device, a three-dimensional representation of a scene;

encoding, by the processing device, a tokenized three-dimensional representation based on the three-dimensional representation of the scene into a latent space using a machine learning model; and decoding, by the processing device, three-dimensional information related to the scene from the latent space using the machine learning model.

2. The method of claim 1, wherein the three-dimensional representation of the scene is a three-dimensional Gaussian splatting representation constructed based on digital images depicting different views of the scene.

3. The method of claim 1, wherein the machine learning model is a transformer-based variational autoencoder that is trained based on the three-dimensional information related to the scene to generate an additional three-dimensional representation based on the three-dimensional information related to the scene.

4. The method of claim 3, wherein the additional three-dimensional representation is based on a received input describing a different scene having a visual feature of the scene.

5. The method of claim 1, wherein the encoding the tokenized three-dimensional representation involves tokenizing the three-dimensional representation into canonical three-dimensional tokens using a transformer-based variational autoencoder.

6. The method of claim 1, further comprising embedding a parametric three-dimensional structure of the scene into the tokenized three-dimensional representation by initializing learnable queries with regular volume grids and associated descriptors related to three-dimensional geometry and optimizing the parametric three-dimensional structure by training the machine learning model to restore the three-dimensional representation of the scene.

7. The method of claim 1, wherein the three-dimensional information related to the scene describes at least one of geometry or lighting related to the scene.

8. The method of claim 1, further comprising initializing the three-dimensional representation of the scene with volume grids and associated descriptors for generating the latent space.

9. The method of claim 1, wherein the three-dimensional representation of the scene indicates parameters including at least one of rotation, translation, scale, center position, scale, or opacity.

10. A system comprising:

a memory component; and a processing device coupled to the memory component, the processing device to perform operations comprising:

receiving digital images depicting different views of a scene;

encoding a tokenized three-dimensional Gaussian splatting representation based on the digital images into a latent space using a machine learning model; and identifying three-dimensional information related to the scene by decoding the latent space using the machine learning model.

11. The system of claim 10, wherein encoding the tokenized three-dimensional Gaussian splatting representation involves tokenizing a three-dimensional Gaussian splatting representation based on the digital images into canonical three-dimensional tokens using a transformer-based variational autoencoder.

12. The system of claim 10, wherein the machine learning model is a transformer-based variational autoencoder that is trained based on the three-dimensional information related to the scene to generate a three-dimensional representation based on the three-dimensional information related to the scene.

13. The system of claim 10, further configured to perform operations comprising embedding a parametric three-dimensional structure into the tokenized three-dimensional Gaussian splatting representation by initializing learnable queries with regular volume grids and associated descriptors related to three-dimensional geometry.

14. The system of claim 13, further configured to perform operations comprising optimizing the parametric three-dimensional structure of the scene by training the machine learning model to restore a three-dimensional Gaussian splatting representation of the scene.

15. The system of claim 10, wherein the three-dimensional information related to the scene describes at least one of geometry or lighting related to the scene.

16. The system of claim 10, further configured to perform operations comprising initializing a three-dimensional Gaussian splatting representation of the scene based on the digital images with volume grids and associated descriptors for generating the latent space.

17. A method comprising:

receiving, by a processing device, digital images depicting different views of a scene; and training, by the processing device, a machine learning model to generate a three-dimensional representation based on the scene by:

encoding a tokenized three-dimensional Gaussian splatting representation based on the digital images using the machine learning model;

modeling a latent space using the machine learning model based on the tokenized three-dimensional Gaussian splatting representation; and determining three-dimensional information related to the scene for generating the three-dimensional representation by decoding the latent space using the machine learning model.

18. The method of claim 17, wherein the encoding the tokenized three-dimensional Gaussian splatting representation involves tokenizing a three-dimensional Gaussian splatting representation of the digital images into canonical three-dimensional tokens using a transformer-based variational autoencoder.

19. The method of claim 17, further comprising embedding a parametric three-dimensional structure into the tokenized three-dimensional Gaussian splatting representation by initializing learnable queries with regular volume grids and associated descriptors.

20. The method of claim 17, wherein the three-dimensional information related to the scene describes at least one of geometry or lighting related to the scene.

* * * * *